F. H. WEAVER.
PLANTER AND FERTILIZER DISTRIBUTER.
APPLICATION FILED AUG. 20, 1908.

986,250.

Patented Mar. 7, 1911.

UNITED STATES PATENT OFFICE.

FLEMING H. WEAVER, OF GRIFFIN, GEORGIA.

PLANTER AND FERTILIZER-DISTRIBUTER.

986,250.  Specification of Letters Patent.  Patented Mar. 7, 1911.

Application filed August 20, 1908. Serial No. 449,424.

*To all whom it may concern:*

Be it known that I, FLEMING H. WEAVER, a citizen of the United States, residing at Griffin, in the county of Spalding and State of Georgia, have invented a new and useful Planter and Fertilizer-Distributer; and I do hereby declare the following to be a full, clear, and exact description of the invention, such as will enable others skilled in the art to which it appertains to make and use the same.

The invention about to be set forth and claimed pertains to new and useful combination double grain drill and guano distributer.

The invention in its fundamental principles has for its primary object to provide a device of this design, comprising novel means for supporting a hopper of a combination fertilizer and grain distributer.

A further object of the invention is the provision of means for holding furrow opener standards in their proper positions.

This invention comprises further objects and combination of elements which will be hereinafter more fully described, shown in the accompanying drawings, and the novel features thereof will be pointed out by the appended claim.

To obtain a full and correct understanding of the details of construction, combination of features, elements and advantages, reference is to be had to the hereinafter set forth description and the accompanying drawings in connection therewith, wherein—

Figure 1:
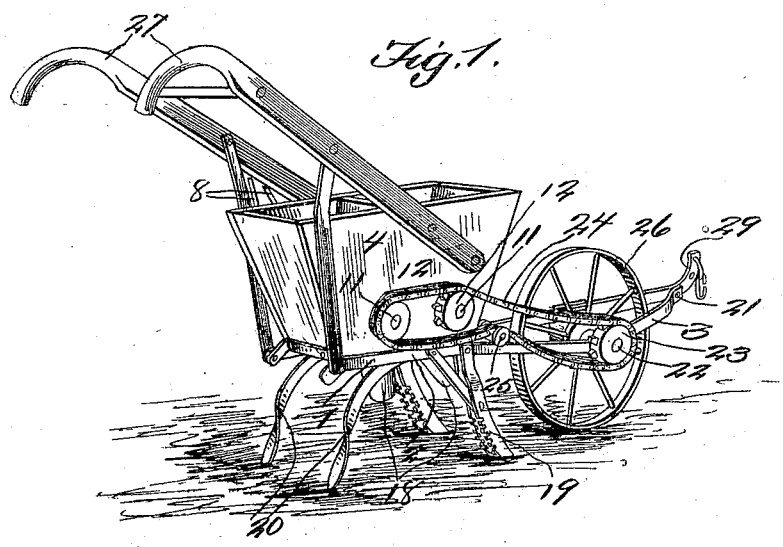
Figure 2:
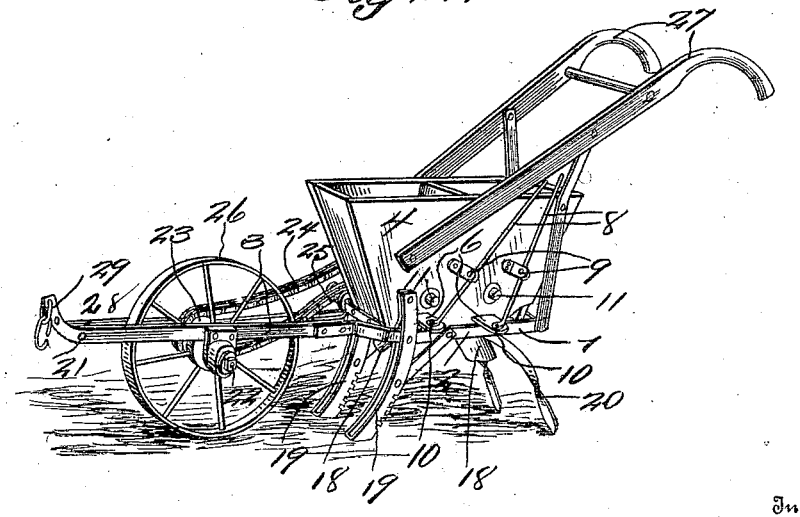

Figure 1 is a perspective view of the combination grain drill and guano distributer. Fig. 2 is a perspective view of the device looking at the opposite side to that shown in Fig. 1.

In regard to the drawings wherein similar reference characters indicate corresponding parts in the several illustrations, by figures, 1 designates a frame, the rear portion of which is rectangular in plan view, while the forward portion is of a diamond shaped contour as at 2 and 3. Fixed above the rectangular portion of the frame is a hopper 4 having two compartments, in which grain or guano may be deposited, for distribution, as will be seen in Figs. 1 and 2 of the drawings.

Pivoted at 9 to one of the sides of the hopper are the levers 8, the lower ends of which are pivoted at 10 to the extension 6 of the slides (not shown) for controlling the chutes 18. The chutes 18 are for the purpose of guiding the grain or guano to the soil.

Referring more particularly to Fig. 1, there will be seen shafts 11, which carry the agitating mechanism (not shown) for the planter, and journaled upon the ends of the shafts 11 are the sprockets 12.

Projecting downwardly from the rectangular portion of the frame, and at its forward portion are standards 19 designed for the purpose of opening the soil, and projecting from the rear portion of this rectangular portion of the frame are members 20, designed for the purpose of covering the grain after being deposited or for scattering the guano, so as to more readily distribute the same over the soil; these members 20 also break the clods of the soil as the apparatus is drawn over the field.

The diamond shaped portion of the frame, comprise two arms which are fastened together at their forward ends as at 21 and extending transversely of these bars is a shaft or axle 22 upon the end of which a sprocket wheel 23 is mounted, about which a sprocket chain 24 is designed to travel which chain also travels about the sprockets 12 upon the shafts of the agitators, as seen clearly in Fig. 1 of the drawings. This sprocket chain is guided by a pulley or idler 25 which projects laterally from the boxing or casing. Also mounted upon the shaft 22 is a wheel 26 designed as will be observed for engaging the upper surface of the soil so that the said shaft 22 may be rotated as the apparatus is drawn forward. Projecting rearwardly from the boxing or casing are a pair of handles 27 by which the apparatus is guided as the same is drawn forward.

The diamond shaped portion of the frame as at 28 is provided with an extension 29, to which an evener or equalizer may be attached, as will be clearly evident.

From the foregoing the essential features, elements, and the operation of the device, together with the simplicity thereof will be clearly apparent.

Having thus described the invention what is claimed as new and useful by the protection of Letters Patent, is—

In a device as set forth, a horizontally disposed metallic frame consisting of side bars spaced apart at their rear portions and converging at their forward portions and providing a restricted space therebetween, a traction wheel journaled in said forward portions; a pair of bars arranged transversely between the rear portions of the side bars, one being arranged and secured to and at the point where the side bars begin to converge, while the other is arranged and secured to and between the rear ends thereof; a hopper having forward and rear sloping end faces; said transversely arranged bars being sloping to conform to the slope of the end faces of the hopper and secured to it, thus acting as a support therefor; forward furrow opener standards, each formed of one piece bent upon itself and straddling and secured to each side bar, said standards having their upper ends secured together above the side bars and with their inner portions arranged between the side bars and the hopper; angular braces connecting the standards and the side bars, and furrow coverers secured to and projecting rearwardly of the side bars.

In testimony whereof I have signed my name to this specification in the presence of two subscribing witnesses.

FLEMING H. WEAVER.

Witnesses:
W. L. GOODRICH,
WM. E. H. SEARCY, Jr.